UNITED STATES PATENT OFFICE.

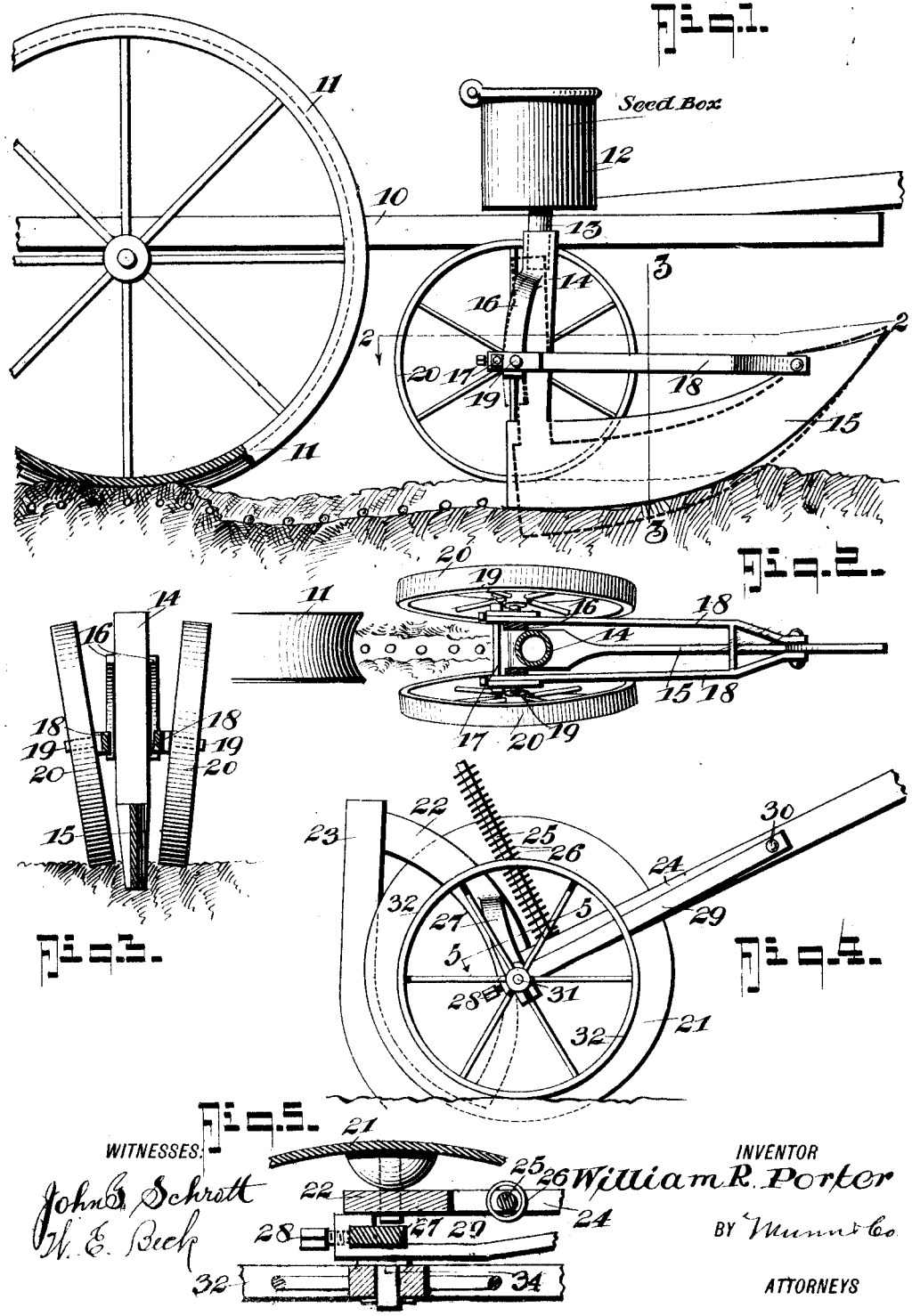

WILLIAM R. PORTER, OF AGRICULTURAL COLLEGE, NORTH DAKOTA.

SEEDING-MACHINE.

1,200,232.  Specification of Letters Patent.  Patented Oct. 3, 1916.

Application filed October 8, 1915. Serial No. 54,749.

*To all whom it may concern:*

Be it known that I, WILLIAM R. PORTER, a citizen of the United States, and a resident of Agricultural College, in the county of Cass and State of North Dakota, have invented an Improvement in Seeding-Machines, of which the following is a specification.

This invention is an improvement in agricultural machines and has particular reference to a furrow opener adapted for use in connection with any species of seeding apparatus.

An object of the invention is the provision of a novel means for forming a furrow of uniform depth regardless of the unevenness of the surface or density of the soil itself whereby seed deposited therein will germinate evenly and thus produce a uniform crop.

Another object is to provide means for adjusting certain parts so as to regulate the depth of the furrow which should vary according to the kind of seed being planted.

The inventive idea involved is capable of receiving a variety of mechanical expressions, some of which, for the purpose of illustrating the invention, are shown in the accompanying drawing, in which—

Figure 1 is a fragmentary side elevation of a seeding machine showing the invention applied thereto. Fig. 2 is a section on the line 2—2 of Fig. 1. Fig. 3 is a section on the line 3—3 of Fig. 1. Fig. 4 is a side elevation of a modified form of the invention. Fig. 5 is a section on the line 5—5 of Fig. 4.

Referring to the drawings and more particularly to Figs. 1 to 3 inclusive, the numeral 10 indicates generally a portion of the main frame of a seeding machine of ordinary construction having mounted therein a large covering wheel 11 which is adapted to cover the furrow after the seeds have been planted, as shown in Fig. 1. Forwardly of the wheel 11 the frame has mounted thereon the usual seed hopper 12 having a feed 13 in the bottom thereof which is mounted in the vertical tube portion 14 of the ordinary form of furrow shoe 15 which is usually employed on machines of this character. Preferably formed integrally with the vertical portion 14 and arranged on each side thereof and offset therefrom is a downwardly extending supporting arm 16 to which is secured, by means of a bolt 17, the adjacent end of an arm forming a portion of the pivoted frame 18, the other ends of the arms converging forwardly and being secured to the forward end of the shoe 15. Each arm of the frame 18 has extending therefrom at its rear end a stub axle 19 on which is mounted a wheel 20 which is adapted to engage the ground on each side of the furrow substantially opposite the deepest point thereof whereby the depth of the same is uniformly maintained. Should it be desired to increase or decrease the depth of the furrow it is only necessary to unloosen the bolt 17 and move the inner end of the frame 18 upwardly or downwardly on the arm 16. The dotted line position in Fig. 1 shows an adjustment of the shoe 15 when it is desired to increase the depth of the furrow.

In the embodiment in Figs. 4 and 5, a single concavo-convex disk 21 is employed in lieu of the shoe 15 and is journaled in the curved forwardly extending arm 22 the upper end of which is connected to the vertical seed tube or chute 23. The lower end of said arm preferably has extending therefrom in a diagonally upward direction the draw bar 24 having mounted thereon at right angles a rod 25 the upper end of which is secured to a portion of the frame of the machine. This rod 25 has coiled thereabout a spring 26 which is adapted to exert a pressure upon said draw bar whereby a fairly constant pressure is indirectly maintained upon the disk 21. The arm 22 has preferably formed integrally therewith an offset therefrom curved support 27 similar to the support 16, in Fig. 1, and is adapted to have connected thereto, by means of a set screw 28, the rear end of a swinging member 29 the forward end of which is secured to the draw bar 24 as indicated at 30. The member 29 adjacent its inner end is provided with a stub axle 31 upon which is mounted the wheel 32. It will thus be seen that, in this construction also, the wheel 32 is arranged alongside of the furrow opener in such manner that the point of contact of the wheel with the surface of the ground will be substantially opposite the lowest point of the furrow opener. When it is found necessary to change the depth of the furrow the set screw 28 is loosened and the member 29 swung upwardly or downwardly along the support 27 until the relative position between the disk 21 and wheel 32 is such that the desired depth of the furrow is secured.

It will be observed from the foregoing description taken in connection with the drawing that the surface engaging wheels are, in each instance, arranged alongside of the furrow opener so that the point of contact of the wheels with the surface of the ground is substantially opposite the lowest point of said furrow opener. This construction is primarily designed to permit of the furrow opener making a furrow of uniform depth and is in contradistinction to known constructions, wherein the supporting wheels are arranged rearwardly of the furrow shoes, which fact prohibits the possibility of opening a furrow of uniform depth when the machine is traveling over uneven surfaces.

What is claimed is:—

A seeding machine comprising a furrow forming implement having a substantially vertical tubular portion, a support extending longitudinally of said vertical portion on each side thereof, a frame pivoted at its forward end to said implement and having a member extending rearwardly on the outer side of each support and terminating adjacent thereto, a bolt extending transversely of said members and connecting the rear ends thereof whereby the same may be drawn together to bind and secure them to said supports to permit of vertical adjustment of said furrow forming implement, and ground engaging elements for supporting said frame and having their axes of rotation passing through said supports.

WILLIAM R. PORTER.

Witnesses:
W. C. PALMER,
W. A. YODER.